Oct. 22, 1935.     V. F. ZAHODIAKIN     2,018,106
PISTON RING QUALITY INDICATOR
Filed Nov. 15, 1933
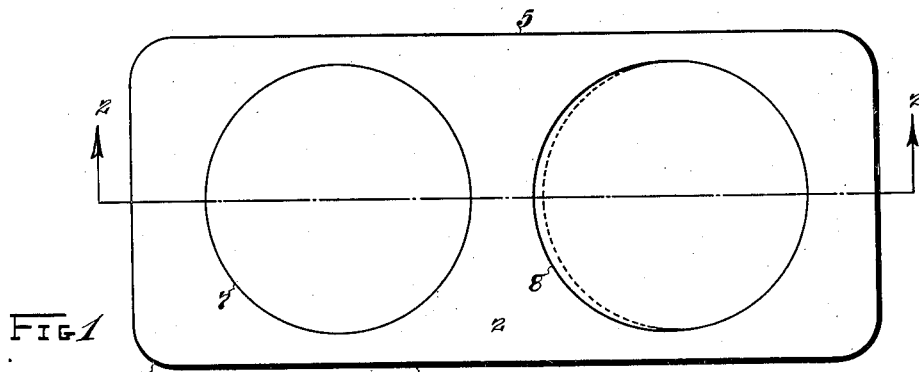
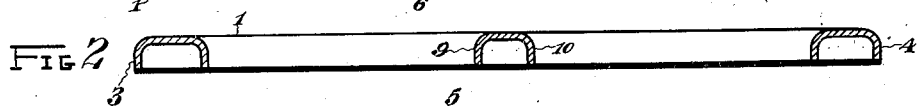
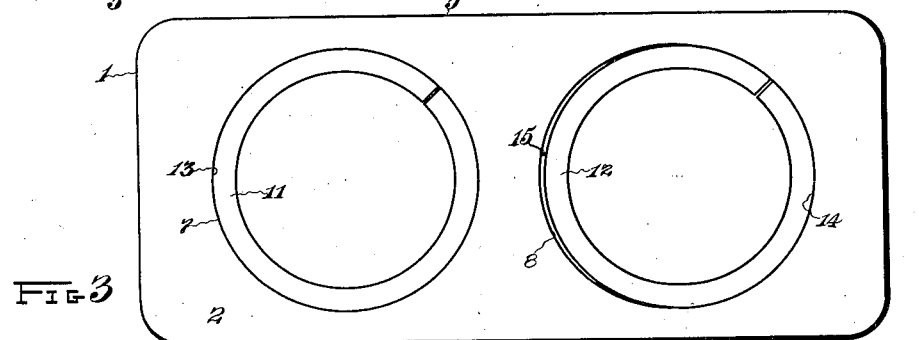
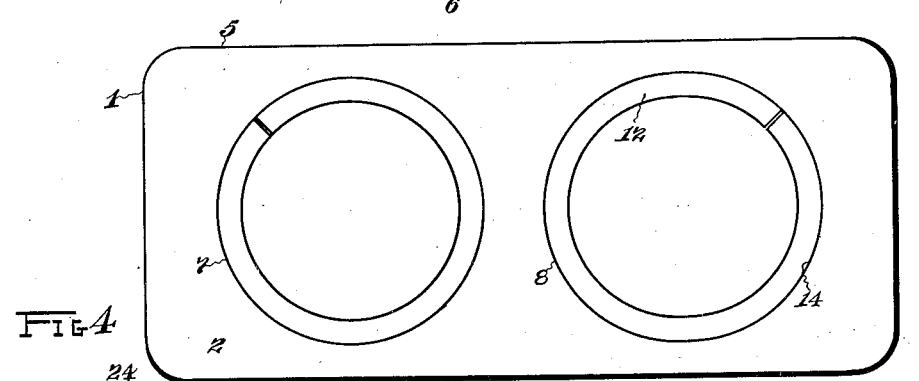
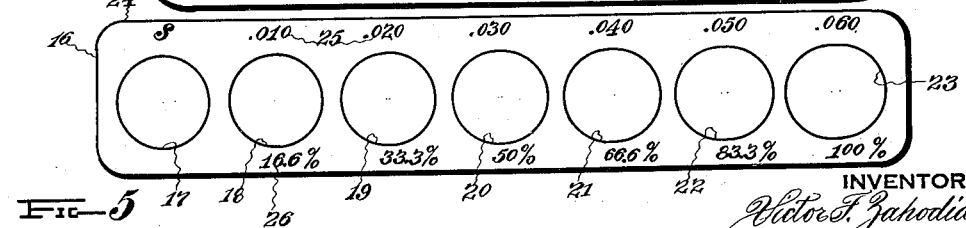
INVENTOR
Victor F. Zahodiakin
BY
Leo. N. Parker
ATTORNEY Patented Oct. 22, 1935

2,018,106

UNITED STATES PATENT OFFICE 2,018,106

PISTON RING QUALITY INDICATOR

Victor F. Zahodiakin, Cincinnati, Ohio, assignor to The Z-Flex Piston Ring Corporation, a corporation of New Jersey Application November 15, 1933, Serial No. 698,141

1 Claim. (Cl. 73—51)

The invention relates to means particularly adapted to indicate the adaptability of a piston ring to expand outwardly and uniformly contact the cylinder walls, irrespective of the shape of the cylinder.

Heretofore, it is a well known fact that manufacturers and sellers of various kinds and makes of piston rings have made statements to the effect that their piston rings are especially adaptable for expanding outwardly and uniformly contacting the cylinder walls, irrespective of the shape of the cylinder. Generally speaking, purchasers are unable to determine whether the various claims made by the manufacturers and sellers of piston rings are true. Consequently, a purchaser of piston rings, who has no opportunity to verify the statements of the manufacturer, may purchase piston rings which he believes will perform efficient service and yet at the same time he is unable to determine that such rings are inefficient until after the same are installed in his engine, compressor or the like mechanism.

The efficiency of piston rings, particularly the oil rings, is of great importance in efficient operation of an internal combustion engine due to the fact that inefficient oil rings permit the oil to enter the combustion chamber of the engine. Consequently, undesirable smoke is developed by the engine, carbon formations are formed in the combustion chamber, on the piston, in the piston ring grooves, on the spark plugs, on the valve stems, valve guides, valve heads, and various other parts of the engine, which results in loss of power and inefficient operation of the engine.

In order to eliminate the usual disadvantages above mentioned, it is very desirable to provide a device or apparatus by which the prospective purchaser of piston rings may instantly make a test for the purpose of determining the efficiency of different kinds of piston rings before the same are placed in his engine. By use of an apparatus of this kind any person, irrespective whether he is experienced in automotive engineering, may determine quickly and scientifically whether or not a piston ring, which he desires to purchase, is adapted to perform efficient service particularly with respect to the adaptability of the ring to expand outwardly and uniformly contact the cylinder walls, irrespective of the shape of the cylinder.

Therefore, the general object of the invention is to provide simple, practical, economical and efficient means by utilization of which any person may quickly and conveniently test the efficiency of a piston ring with respect to its adaptability to expand outwardly and uniformly contact the cylinder walls in which it is intended to be installed.

Other objects of the invention are to provide simple and economical means by which the manufacturer of efficient piston rings may readily test his rings and convincingly impart information to the purchasers and users of piston rings that said rings will operate efficiently; and to provide simple and efficient means whereby the efficiency of a piston ring, with respect to its adaptability to expand outwardly and uniformly contact the cylinder walls, may with reasonable certainty be calculated.

The invention consists in the combination of the elements, arrangement of the parts and in the details of the construction, as hereinafter fully described and claimed.

In the drawing:

Fig. 1 is a plan view of the invention;

Fig. 2 is a section taken on a line corresponding to 2—2 in Fig. 1;

Fig. 3 is a plan view of the invention illustrating an inefficient piston ring;

Fig. 4 is the same illustrating an efficient piston ring; and

Fig. 5 is a plan view showing a modification of the invention.

In the preferred construction of the invention I provide the piston ring quality indicator 1 which comprises the top plate 2 having its end edges 3 and 4 and its side edges 5 and 6 bent downwardly at right angles with the horizontal top 2. Formed in the top plate 2 are the holes 7 and 8, the portions 9 and 10 of the top plate being bent downwardly at right angles with the plate 2 for the purpose of providing legs or supports in combination with the end edges 3 and 4 and the side edges 5 and 6, whereby when said indicator 1 is placed on a table or other horizontal support the holes 7 and 8 are conveniently accessible for purposes fully hereinafter explained.

The hole 7 is round, and the hole 8 is oblong, since the diameter of the hole 8 from the end 3 toward the end 4 of the plate is greater than the diameter of the hole from the side edge 5 to the side edge 6.

The lower edges of the end edges 3 and 4, side edges 5 and 6 and the downwardly bent edges 9 and 10 are in horizontal alignment, whereby the indicator 1 may be supported by a horizontal support and the piston rings 11 and 12 may be placed in the holes 7 and 8 respectively as by light pressure and the rings automatically become properly positioned with respect to their outer edges and which contact the walls of the holes 7 and 8. The downwardly bent edges 9 and 10 of the holes 7 and 8 are adapted to retain the rings 11 and 12 in horizontal position, whereby the contacting outer surfaces 13 and 14 of the rings 11 and 12 are parallel with the inner walls of the edges 9 and 10, whereby the efficiency of the piston ring 12 may be quickly and conveniently determined. This is true because if the piston ring 12 is efficient and adapted to expand outwardly and exert uniform pressure in contact with the cylinder walls, regardless of the shape of the bore, then the outer contacting edge 14 of the piston 12 will contact at all points the walls 14, as shown in Fig. 4, whereas if the piston ring 12 is inefficient, and unadapted to expand outwardly and exert uniform pressure in contact with the cylinder walls, regardless of the shape of the bore in which the piston ring may be installed, then the space 15, intermediate the wall 14 and the outer edge of the piston ring 12 is formed, thereby indicating immediately that the piston ring 12 is inefficient and will not expand outwardly and exert uniform pressure in contact with an oblong cylinder wall in which the ring may be installed.

In Fig. 5 is shown a modification of the invention in which the plate 16 has therein the spaced apart holes 17, 18, 19, 20, 21, 22, and 23. The hole 17 is perfectly round, and the hole 18 is 10/1000 of an inch out of round, the hole 19 is 20/1000 of an inch out of round, the hole 20 is 30/1000 of an inch out of round, the hole 21 is 40/1000 of an inch out of round, the hole 22 is 50/1000 of an inch out of round, and the hole 23 is 60/1000 of an inch out of round.

It is well known that when a piston ring of any make is inserted in the round hole 17 that its outer edge will contact the internal walls of the round hole 17.

The operation of the form of the invention shown in Fig. 5 is as follows:

When it is desired to test the efficiency of a piston ring, the piston ring first is placed in the hole 17 which is round. If the outer edge of the piston ring contacts the walls of the hole 17 at all points, it is indicated that the piston ring is round and that the outer edge is not defective. Then the piston ring is placed in the hole 18. If the outer edge of the piston ring contacts the walls of the hole 18 at all points this indicates that the ring is capable of operating efficiently in a cylinder whose walls are 10/1000 of an inch out of round. Then the same ring may be placed in the hole 19, and if its outer edge contacts the walls of the hole 19 at all points, this test indicates that the piston ring will operate efficiently in a cylinder whose walls are out of round 20/1000 of an inch. Afterward the ring may be inserted in the holes 20, 21, 22, and 23 successively and if the outer edge of the piston ring contacts at all points the walls of all of these holes, this test indicates that the piston ring has high efficiency, since it will operate efficiently in a cylinder whose walls are out of round 60/1000 of an inch or more. If, however, the piston ring will not operate efficiently in a cylinder whose walls are out of round 60/1000 of an inch, it may be readily determined at what efficiency the piston ring is adapted to operate in an internal combustion engine, or other cylinders. For instance, assuming that the piston ring being tested has expanded outwardly and contacted its outer edge at all points with the walls of the holes 17, 18, 19, and 20, and when the ring is placed in the hole 21 a space is formed between the outer edge of the piston ring and the wall of the hole 21, then it may be assumed that the piston ring is not sufficiently efficient to operate satisfactorily in a cylinder whose walls are 40/1000 of an inch out of round.

Therefore, it is quite evident that various kinds of piston rings may be quickly and conveniently tested, whereby the operator may readily determine whether the piston ring being tested can be depended upon to operate efficiently in a cylinder whose walls are out of round a predetermined degree.

On the top 24 of the tester 16 are the characters 25 respectively positioned in horizontal alignment with the various holes, and such characters indicate the amount that the respective holes are out of round. Oppositely disposed of the respective holes are the characters 26 which indicate the percent of efficiency of a piston ring being tested in the various holes, it being assumed that when a piston ring is adapted to operate efficiently in a cylinder whose walls are out of round 60/1000 of an inch that this ring is 100 per cent. efficient. Therefore, for instance, a piston ring whose outer edge will contact at all points the walls of the hole 20, and this same ring when inserted in the hole 21 operates in such a manner that a space is provided between the outer edge of the piston ring and the walls of the hole 20 then it may be assumed, from the standpoint of efficiency, that the ring is 50 per cent. efficient.

An important advantage is that by use of the invention the efficient operation of a piston ring may be readily and quickly determined without necessity of installing the ring in an internal combustion engine cylinder. Moreover, the prospective purchasers and users of piston rings may satisfy themselves as to which of the various rings presently being manufactured and sold is most efficient, without relying upon statements and advertising issued by the manufacturers of such rings.

Another important advantage of the invention is that heretofore in order that efficient operation of a piston ring may be tested it has been necessary that such ring be installed in the cylinder of an engine, and few operators of the engine have been able to determine the efficient operation of the ring, particularly for the reason that the ring operates within the cylinder and is concealed from ordinary inspection. Nevertheless, when an internal combustion engine is provided with inefficient piston rings the normal economic operation of the engine is importantly impaired for various reasons well known in the art.

It is, therefore, quite apparent that I have invented a highly desirable device for the purposes intended, and which may be utilized by the manufacturers and sellers of efficient piston rings to readily demonstrate to prospective purchasers and users, that such rings are actually efficient and will operate thoroughly efficient when installed. Moreover, by the use of applicant's invention any person may determine with reasonable accuracy the efficiency of all different kinds and makes of piston rings simply by making the test as heretofore clearly explained. It is well known that the efficient performance and operation of a piston ring is dependent to a great extent upon its flexibility. Therefore, by utilization of applicant's invention the degree of flexibility of a ring being tested may be readily determined.

Another important advantage of the invention is that when a piston ring is being tested, and in order to determine whether or not a space is formed between the outer edge of the piston ring and the walls of the hole in which the ring is inserted, it simply is necessary to provide illumination below the plate 2, whereby it may be readily and quickly determined whether or not the outer edge of the piston ring contacts at all points the walls of the hole.

While I believe that the form of the invention illustrated in the drawing and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claim.

Various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claim.

What I claim as new and desire to secure by Letters Patent is:

As an article of manufacture, a piston ring gauge comprising a plate having a plurality of bores therein, one of said bores being truly cylindrical and one or more varying from a true cylinder, whereby a piston ring can be placed in said first opening for determining whether or not it is truly circular and can be placed in said other opening or openings for determining whether or not it will expand to take up variation from a true cylinder.

VICTOR F. ZAHODIAKIN.